US008639624B2

(12) United States Patent
Ono et al.

(10) Patent No.: US 8,639,624 B2
(45) Date of Patent: Jan. 28, 2014

(54) ENTRANCE MANAGEMENT SYSTEM, CONTROL METHOD THEREOF, INFORMATION STORAGE MEDIUM, AUTHENTICATION SERVER, GATE APPARATUS, AND STORAGE MEDIUM STORING PROGRAM

(75) Inventors: Yoshiyuki Ono, Tokyo (JP); Masahiro Taguchi, Tokyo (JP); Katsumi Yamagishi, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 2130 days.

(21) Appl. No.: 11/392,607

(22) Filed: Mar. 30, 2006

(65) Prior Publication Data
US 2007/0078782 A1 Apr. 5, 2007

(30) Foreign Application Priority Data

Sep. 30, 2005 (JP) ................................. 2005-289318

(51) Int. Cl.
*G06Q 20/00* (2012.01)
*G06F 21/00* (2013.01)
*G06Q 20/34* (2012.01)
*G07C 9/00* (2006.01)

(52) U.S. Cl.
CPC .......... *G06Q 20/346* (2013.01); *G07C 9/00103* (2013.01)
USPC ........................................... 705/50; 235/382

(58) Field of Classification Search
USPC .......................................................... 235/380
See application file for complete search history.

(56) References Cited

U.S. PATENT DOCUMENTS

| 6,601,037 | B1 * | 7/2003 | Kolls ........................ 705/14.51 |
| 6,840,443 | B2 * | 1/2005 | Azuma ........................ 235/382 |
| 7,140,535 | B2 * | 11/2006 | Sussman ...................... 235/375 |
| 2001/0041994 | A1 * | 11/2001 | Kim .................................. 705/5 |
| 2002/0007462 | A1 * | 1/2002 | Omata ........................ 713/202 |
| 2002/0026478 | A1 * | 2/2002 | Rodgers et al. .............. 709/205 |
| 2004/0114779 | A1 * | 6/2004 | Blazey ........................ 382/100 |
| 2007/0168674 | A1 * | 7/2007 | Nonaka et al. ............... 713/182 |

FOREIGN PATENT DOCUMENTS

| JP | A-2000-259878 | 9/2000 |
| JP | A-2002-41469 | 2/2002 |
| JP | A 2002-197500 | 7/2002 |
| JP | A-2003-109053 | 4/2003 |
| JP | A-2004-246553 | 9/2004 |
| JP | A 2004-355318 | 12/2004 |
| JP | A 2005-100359 | 4/2005 |

OTHER PUBLICATIONS

Aug. 9, 2011 Office Action issued in Japanese Patent Application No. 2005-289318 (with translation).

* cited by examiner

*Primary Examiner* — Calvin L Hewitt, II
*Assistant Examiner* — Mohammad A Nilforoush
(74) *Attorney, Agent, or Firm* — Oliff and Berridge, PLC

(57) ABSTRACT

An entrance management system includes: an authentication gate apparatus which reads the user identifier stored in an information storage medium, controls the user's entrance to a management zone based on the user identifier, generates an intrazone user identifier associated with the user identifier and writes the intrazone user identifier to the information storage medium when the user is allowed to enter the management zone; and an information processing apparatus, installed in the management zone, which reads the intrazone user identifier written in the information storage medium and records information concerning use of the information processing apparatus by the user in association with the intrazone user identifier.

4 Claims, 11 Drawing Sheets

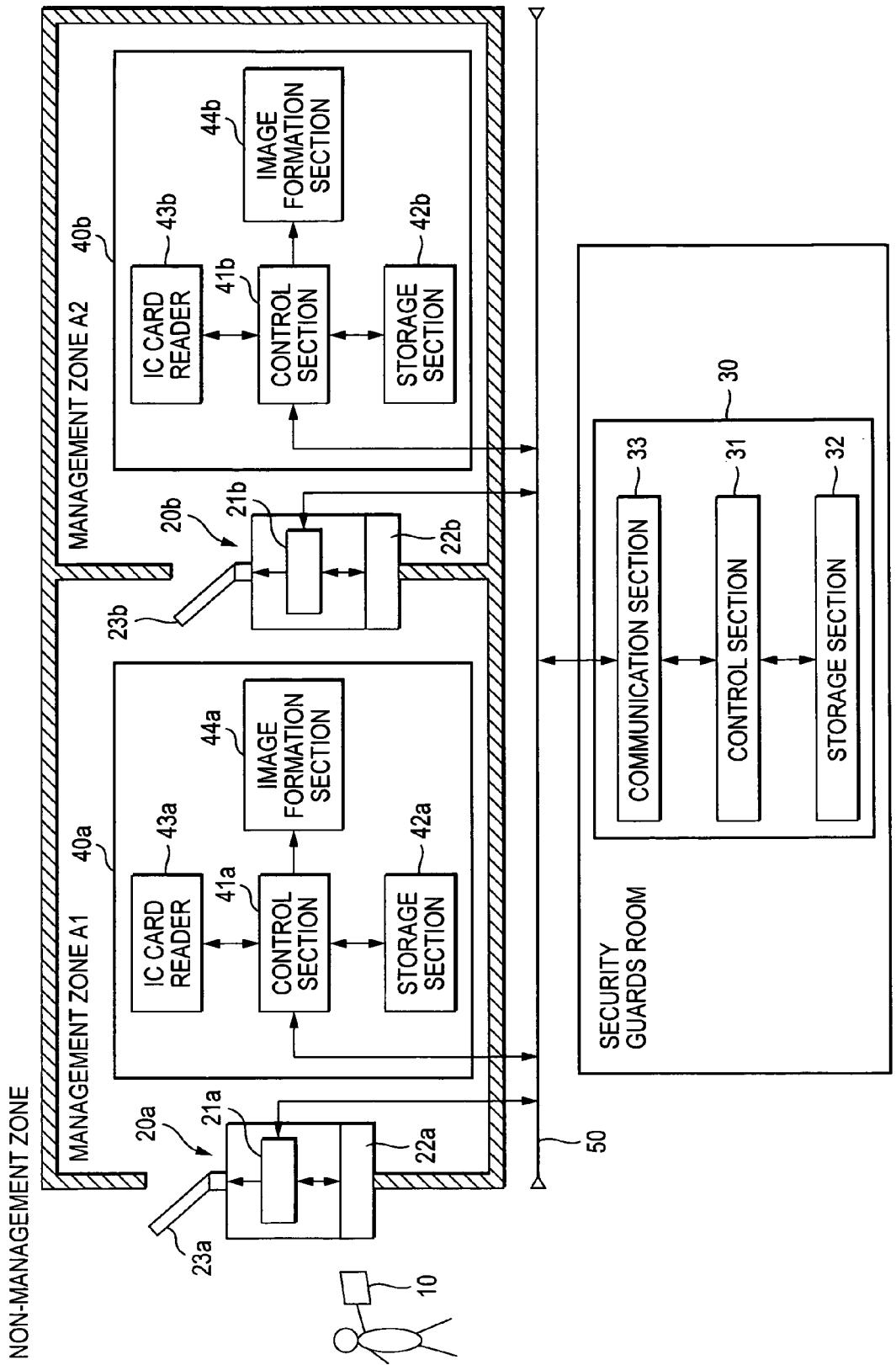

FIG. 2 (a)

| SERVICE CLASS | ITEM NAME | DATA | KEY DATA REQUIRED/NOT REQUIRED AT READ TIME | KEY DATA REQUIRED/NOT REQUIRED AT WRITE TIME |
|---|---|---|---|---|
| READ ONLY | INITIAL USER ID | AA12345 | REQUIRED | - |
| WRITABLE | INTRAZONE USER ID | NULL | NOT REQUIRED | REQUIRED |

FIG. 2 (b)

| SERVICE CLASS | ITEM NAME | DATA | KEY DATA REQUIRED/NOT REQUIRED AT READ TIME | KEY DATA REQUIRED/NOT REQUIRED AT WRITE TIME |
|---|---|---|---|---|
| READ ONLY | INITIAL USER ID | AA12345 | REQUIRED | - |
| WRITABLE | INTRAZONE USER ID | A1G20a050725001 | NOT REQUIRED | REQUIRED |

FIG. 2 (c)

| SERVICE CLASS | ITEM NAME | DATA | KEY DATA REQUIRED/NOT REQUIRED AT READ TIME | KEY DATA REQUIRED/NOT REQUIRED AT WRITE TIME |
|---|---|---|---|---|
| READ ONLY | INITIAL USER ID | AA12345 | REQUIRED | - |
| WRITABLE | INTRAZONE USER ID | A2G20b050725001 | NOT REQUIRED | REQUIRED |

FIG. 3

| INITIAL USER ID | USER ATTRIBUTE | ENTRANCE INTO MANAGEMENT ZONE A1 PERMITTED/NOT PERMITTED | ENTRANCE INTO MANAGEMENT ZONE A2 PERMITTED/NOT PERMITTED |
|---|---|---|---|
| AA12345 | SYSTEM ADMINISTRATOR | PERMITTED | PERMITTED |
| AA99999 | DEVELOPER | PERMITTED | PERMITTED |
| AB33333 | DEVELOPER | PERMITTED | NOT PERMITTED |
| Z11111 | GUARD | PERMITTED | PERMITTED |

FIG. 4

| INITIAL USER ID | USER ATTRIBUTE | USE OF PRINTER 40a PERMITTED/NOT PERMITTED | USE OF PRINTER 40b PERMITTED/NOT PERMITTED |
|---|---|---|---|
| AA12345 | SYSTEM ADMINISTRATOR | PERMITTED | NOT PERMITTED |
| AA99999 | DEVELOPER | PERMITTED | PERMITTED |
| AB33333 | DEVELOPER | PERMITTED | NOT PERMITTED |
| Z11111 | GUARD | NOT PERMITTED | NOT PERMITTED |

FIG. 6 (a)

| INTRAZONE USER ID | USER ATTRIBUTE | ENTRANCE INTO MANAGEMENT ZONE A1 PERMITTED/NOT PERMITTED | ENTRANCE INTO MANAGEMENT ZONE A2 PERMITTED/NOT PERMITTED |
|---|---|---|---|
| A1G20a050725001 | SYSTEM ADMINISTRATOR | PERMITTED | PERMITTED |

FIG. 6 (b)

| INTRAZONE USER ID | USER ATTRIBUTE | ENTRANCE INTO MANAGEMENT ZONE A1 PERMITTED/NOT PERMITTED | ENTRANCE INTO MANAGEMENT ZONE A2 PERMITTED/NOT PERMITTED |
|---|---|---|---|
| A2G20b050725001 | SYSTEM ADMINISTRATOR | PERMITTED | PERMITTED |

FIG. 7 (a)

| INTRAZONE USER ID | USER ATTRIBUTE | USE OF PRINTER 40a PERMITTED/NOT PERMITTED | USE OF PRINTER 40b PERMITTED/NOT PERMITTED |
|---|---|---|---|
| A1G20a050725001 | SYSTEM ADMINISTRATOR | PERMITTED | NOT PERMITTED |

FIG. 7 (b)

| INTRAZONE USER ID | USER ATTRIBUTE | USE OF PRINTER 40a PERMITTED/NOT PERMITTED | USE OF PRINTER 40b PERMITTED/NOT PERMITTED |
|---|---|---|---|
| A2G20b050725001 | SYSTEM ADMINISTRATOR | PERMITTED | NOT PERMITTED |

FIG. 8 (a)

| OLD USER ID | NEW USER ID | DATE | TIME | PASSED GATE APPARATUS | ZONE BEFORE GATE PASSAGE | ZONE AFTER GATE PASSAGE |
|---|---|---|---|---|---|---|
| AA12345 | A1G20a050725001 | 2005/7/25 | 9:30:15 | GATE APPARATUS 20a | NON-MANAGEMENT ZONE | MANAGEMENT ZONE A1 |

FIG. 8 (b)

| OLD USER ID | NEW USER ID | DATE | TIME | PASSED GATE APPARATUS | ZONE BEFORE GATE PASSAGE | ZONE AFTER GATE PASSAGE |
|---|---|---|---|---|---|---|
| AA12345 | A1G20a050725001 | 2005/7/25 | 9:30:15 | GATE APPARATUS 20a | NON-MANAGEMENT ZONE | MANAGEMENT ZONE A1 |
| A1G20a050725001 | A2G20b050725001 | 2005/7/25 | 10:55:05 | GATE APPARATUS 20b | MANAGEMENT ZONE A1 | MANAGEMENT ZONE A2 |

FIG. 8 (c)

| OLD USER ID | NEW USER ID | DATE | TIME | PASSED GATE APPARATUS | ZONE BEFORE GATE PASSAGE | ZONE AFTER GATE PASSAGE |
|---|---|---|---|---|---|---|
| AA12345 | A1G20a050725001 | 2005/7/25 | 9:30:15 | GATE APPARATUS 20a | NON-MANAGEMENT ZONE | MANAGEMENT ZONE A1 |
| A1G20a050725001 | A2G20b050725001 | 2005/7/25 | 10:55:05 | GATE APPARATUS 20b | MANAGEMENT ZONE A1 | MANAGEMENT ZONE A2 |
| A2G20b050725001 | A1G20a050725001 | 2005/7/25 | 14:55:05 | GATE APPARATUS 20b | MANAGEMENT ZONE A2 | MANAGEMENT ZONE A1 |
| A1G20a050725002 | AA12345 | 2005/7/25 | 15:59:05 | GATE APPARATUS 20a | MANAGEMENT ZONE A1 | NON-MANAGEMENT ZONE |

FIG. 10

| INTRAZONE USER ID | USER ATTRIBUTE | DATE | TIME | JOB TYPE | PROCESSED DATA | NUMBER OF MEDIA |
|---|---|---|---|---|---|---|
| A1G20a050725001 | SYSTEM ADMINISTRATOR | 2005/7/25 | 9:41:33 | PRINT | aaaa.dat | 10 |

ENTRANCE MANAGEMENT SYSTEM, CONTROL METHOD THEREOF, INFORMATION STORAGE MEDIUM, AUTHENTICATION SERVER, GATE APPARATUS, AND STORAGE MEDIUM STORING PROGRAM

BACKGROUND (i) Technical Field

This invention relates to an entrance and exit management system for recording information concerning entrance and exit of users into and from a management zone where an information processing apparatus is installed and information concerning use of the information processing apparatus by the user, a control method of the entrance and exit management system, and an information storage medium, an authentication server, a gate apparatus, and a program used with the entrance and exit management system.

(ii) Related Art

For example, an entrance and exit management system for managing entrance and exit of users into and from a management zone using an information storage medium such as an IC card and a gate apparatus is available. Such an entrance and exit management system manages entrance and exit according to the following procedure: First, the user causes an IC card reader/writer installed in the gate apparatus to read information stored on his or her possessed IC card. The IC card stores at least the unique user identifier for each user. The gate apparatus transmits the user identifier read through the IC card reader/writer to an authentication server, which then conducts authentication of the user using the user identifier. Specifically, the authentication server holds a user entrance and exit master of a database for associating each user identifier and information concerning permission of entrance and exit with each other, and uses the user entrance and exit master to determine whether or not to permit entrance of the user corresponding to the user identifier into the management zone. If the authentication server determines that entrance of the user into the management zone is permitted, the gate apparatus executes control so as to open the gate in response to the result. Accordingly, the user can enter the management zone. The entrance and exit management system can also perform similar control when the user exits the management zone as required, thereby managing the exit of the user.

SUMMARY

This invention can provide an entrance and exit management system comprising: an information storage medium which stores a user identifier for identifying a user from other users; an authentication gate apparatus which reads the user identifier from the information storage medium possessed by the user, which determines, based on the user identifier, whether or not the user possessing the information storage medium is to be permitted to enter a management zone, which generates an intrazone user identifier associated with the user identifier and writes the intrazone user identifier to the information storage medium when a result of determination shows that the user is to be permitted to enter the management zone, and which controls opening and closing of a gate disposed between the management zone and a non-management zone to permit the user to enter the management zone when the result of determination shows that the user is to be permitted to enter the management zone; and an information processing apparatus which is installed in the management zone, which reads the intrazone user identifier from the information storage medium and which records information concerning use of the information processing apparatus by the user in association with the intrazone user identifier.

This invention can provide an information storage medium used in an entrance and exit management system which manages entrance and exit of a user into and from a management zone based on a user identifier for identifying a user from other users, which generates an intrazone user identifier associated with the user identifier when the user is to be permitted to enter the management zone, and which manages use of an information processing apparatus by the user based on the intrazone user identifier, the information processing apparatus being installed in the management zone and capable of recording the intrazone user identifier in association with information concerning the use of the information processing apparatus by the user. The information storage medium comprises: user identifier storage means for storing the user identifier readable by the entrance and exit management system; and intrazone user identifier storage means for storing the intrazone user identifier generated by the entrance and exit management system so that the intrazone user identifier is readable by the information processing apparatus.

This invention provides an authentication server used in an entrance and exit management system which obtains a user identifier, for identifying a user from other users, from an information storage medium to manage entrance and exit of a user into and from a management zone based on the user identifier, and which obtains an intrazone user identifier from the information storage medium to manage use of an information processing apparatus by the user based on the intrazone user identifier, the information processing apparatus being installed in the management zone. The authentication server comprises: determination means for determining, based on the user identifier, whether or not the user possessing the information storage medium is to be permitted to enter the management zone; gate opening/closing means for controlling opening and closing of a gate apparatus to permit the user to enter the management zone when a result of determination shows that the user is to be permitted to enter the management zone; intrazone user identifier generation means for generating the intrazone user identifier associated with the user identifier when the result of determination shows that the user is to be permitted to enter the management zone; and intrazone user identifier write means for causing the gate apparatus to write the intrazone user identifier to the information storage medium.

This invention can provide a gate apparatus used in an entrance and exit management system which obtains a user identifier, for identifying a user from other users, from an information storage medium to manage entrance and exit of a user into and from a management zone based on the user identifier, and which obtains an intrazone user identifier from the information storage medium to manage use of an information processing apparatus by the user based on the intrazone user identifier, the information processing apparatus being installed in the management zone. The gate apparatus comprises: user identifier read means for reading the user identifier from the information storage medium and sending the user identifier to an authentication server; entrance gate opening/closing means for controlling opening and closing of a gate to permit the user to enter the management zone when the authentication server determines, based on the user identifier, the user is to be permitted to enter the management zone; intrazone user identifier generation means for generating the intrazone user identifier associated with the user identifier when the authentication server determines that the user is to be permitted to enter the management zone; and intrazone user identifier write means for writing the the generated intrazone user identifier to the information storage medium.

This invention can provide a control method for an entrance and exit management system using an information storage medium storing therein a user identifier for identifying a user from other users, the control method comprising the steps of reading the user identifier from the information storage medium possessed by the user; determining, based on the user identifier, whether or not the user possessing the information storage medium is to be permitted to enter a management zone; generating an intrazone user identifier associated with the user identifier when a result of determination shows that the user is to be permitted to enter the management zone; writing the intrazone user identifier to the information storage medium; controlling opening and closing of a gate disposed between the management zone and a non-management zone to permit the user to enter the management zone when the result of determination shows that the user is to be permitted to enter the management zone; reading the intrazone user identifier from the information storage medium using an information processing apparatus installed in the management zone; and recording information concerning use of the information processing apparatus by the user in association with the intrazone user identifier.

This invention can provide a storage medium readable by a computer, the storage medium storing a program of instructions executable by the computer to perform a function for controlling an entrance and exit management system using an information storage medium storing therein a user identifier for identifying a user from other users, the function comprising the steps of reading the user identifier from the information storage medium possessed by the user; determining, based on the user identifier, whether or not the user possessing the information storage medium is to be permitted to enter a management zone; generating an intrazone user identifier associated with the user identifier when a result of determination shows that the user is to be permitted to enter the management zone; writing the intrazone user identifier to the information storage medium; controlling opening and closing of a gate disposed between the management zone and a non-management zone to permit the user to enter the management zone when the result of determination shows that the user is to be permitted to enter the management zone; reading the intrazone user identifier from the information storage medium using an information processing apparatus installed in the management zone; and recording information concerning use of the information processing apparatus by the user in association with the intrazone user identifier.

Accordingly, this invention can provide an entrance and exit management system capable of enhancing security for recording information concerning entrance and exit of users into and from a management zone where an information processing apparatus is installed and information concerning use of the information processing apparatus by the user, a control method of the entrance and exit management system, and an information storage medium, an authentication server, a gate apparatus, and a program used with the entrance and exit management system.

BRIEF DESCRIPTION OF THE DRAWINGS

Embodiment(s) of the present invention will be described in detail based on the following figures, wherein:

FIG. 1 is a schematic drawing to show a configuration example of an entrance and exit management system according an embodiment of the invention;

FIGS. 2(a), 2(b) and 2(c) show an example of information stored on an IC card 10;

FIG. 3 is a drawing to show an example of a user entrance and exit master retained in a storage section 32 of an authentication server 30;

FIG. 4 is a drawing to show an example of a print service master retained in the storage section 32 of the authentication server 30;

FIGS. 6(a) and 6(b) show an example of a user entrance and exit working DB retained in the storage section 32 of the authentication server 30;

FIGS. 7(a) and 7(b) show an example of a print service working DB retained in the storage section 32 of the authentication server 30;

FIGS. 8(a), 8(b) and 8(c) show an example of a gate passage log retained in the storage section 32 of the authentication server 30;

FIG. 10 is a drawing to show an example of a print log retained in a storage section 42a of the printer 40a.

DETAILED DESCRIPTION

Figure 5:
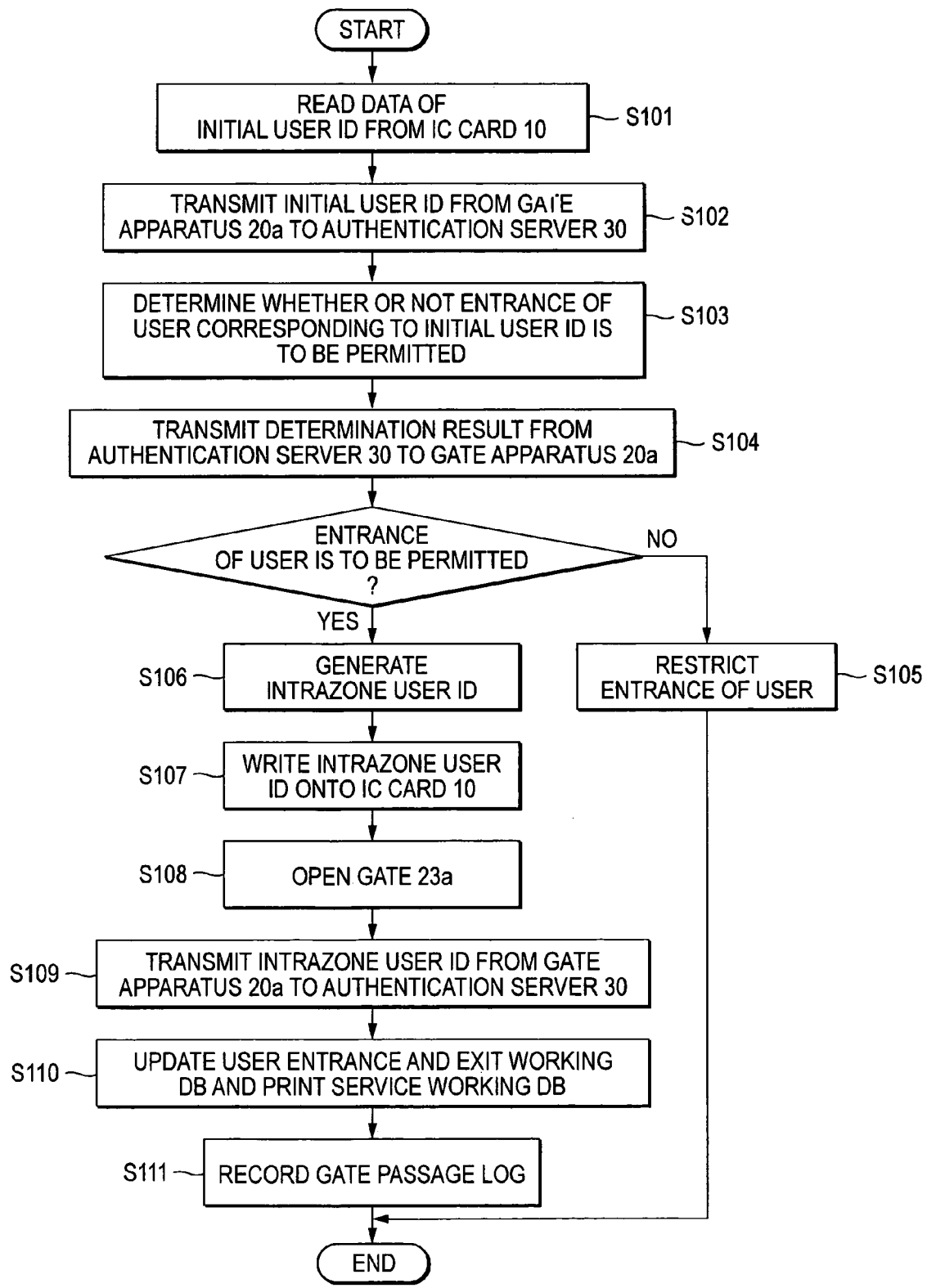
FIG. 5 is a flowchart to show an example of processing executed by the entrance and exit management system according to the embodiment of the invention when the user enters a management zone A1 from a non-management zone.

Referring now to the accompanying drawings, there is shown an embodiment of the invention.

An entrance and exit management system according to an embodiment of the invention is made up of an IC card 10 of an information storage medium, gate apparatus 20a and 20b, an authentication server 30, printers 40a and 40b of information processing apparatus, and a communication network 50, as shown in FIG. 1. The gate apparatus 20a and 20b and the authentication server 30 correspond to an authentication gate apparatus of the invention. The information processing apparatus that can be used in the entrance and exit management system according to the embodiment may be not only printers, but also various information processing apparatus such as a personal computer and a copier having an IC card reader. A plurality of information processing apparatus may be installed in one management zone.

The IC card 10 is an information storage medium that can be carried by the user, and stores information of the user identifier (ID) unique to the user possessing the IC card and the like as data. The IC card 10 stores the data associated with item names such as "initial user ID," for example. Associated with each item name are information of a service class indicating whether or not the data associated with the item name is writable and information as to whether or not key data (for example, personal identification number, etc.,) is required for each of read and write.

The data stored on the IC card can be read through an IC card reader. The data involved in the item name set to writable can be updated with an IC card writer. However, the data involved in the item name set to read only cannot be rewritten with a usual IC card writer. To read or write the data involved in the item name set to key data required, the user enters predetermined key data into the IC card reader, the IC card writer, or the IC card. Accordingly, read/write of the information stored on the IC card can be limited as required and an unauthorized user finding the IC card 10 can be prevented from using the IC card 10.

The key data is a personal identification number of a combination of a predetermined number of digits, a password of any desired character string, etc., for example, managed by the user possessing the IC card. Alternatively, the key data may be biometrics information of fingerprint authentication information, face authentication information, iris authentication information, venous authentication information, etc., of the user possessing the IC card to conduct biometrics. The user enters the key data into the IC card reader, the IC card writer, etc., by operating a ten-key pad or scanning his or her fingerprint, etc., whereby only the essential owner of the IC card is allowed to read/write important information stored on the IC card and security can be enhanced.

The key data may be entered on the IC card rather than into the IC card reader, the IC card writer, etc. Specifically, the IC card is provided with a device capable of reading biometrics information, such as a fingerprint sensor, whereby the user can enter the key data on the IC card. Accordingly, for example, the user causes the IC card reader, etc., to read/write the information stored on the IC card as the user holds the fingerprint sensor part, whereby the user can be saved from having to enter the key data; the convenience can be enhanced.

FIG. 2(a) is a drawing to show an example of data stored on the IC card 10. Here, "AA12345" of the employee number of user U possessing the IC card 10 is stored as data of item name "initial user ID" and the data is read-only and cannot be rewritten. To cause the IC card reader to read the data of the initial user ID, the user needs to enter predetermined key data into the IC card reader or the IC card 10. Further, the IC card 10 includes a storage area for storing data of item name "intrazone user ID" and the data initially is a NULL value representing null. The data involved in the item name "intrazone user ID" is set to writable; to read the data, the key data need not be entered, but to write, the user needs to enter the key data into the IC card writer or the IC card 10.

Each of the gate apparatus 20a and 20b is made up of a gate control section 21, an IC card reader/writer 22, and a gate 23. In the description that follows, the gate control section 21, the IC card reader/writer 22, and the gate 23 contained in the gate apparatus 20a are represented as the gate control section 21a, the IC card reader/writer 22a, and the gate 23a; the gate control section 21, the IC card reader/writer 22, and the gate 23 contained in the gate apparatus 20b are represented as the gate control section 21b, the IC card reader/writer 22b, and the gate 23b when they need to distinguish between the gate apparatus 20a and 20b.

The gate apparatus 20a is an apparatus for managing entrance and exit of users between a non-management zone where many and unspecified persons can come and go and a management zone A1. The gate apparatus 20b is an apparatus for managing entrance and exit of users between the management zone A1 and a management zone A2. The portions of the management zones except for the gate apparatus are surrounded by walls through which persons cannot pass, as hatched in FIG. 1. Thus, basically the user cannot come or go in the management zones unless the user passes through the gate included in the gate apparatus. A plurality of gate apparatus for joining the zones may exist.

The gate control section 21 is a CPU, etc., for example, for controlling the units of the IC card reader/writer 22, the gate 23, etc. It also transmits and receives data of the intrazone user ID, etc., to and from the authentication server 30 through the communication network 50. The processing executed by the gate control section 21 in the embodiment is described later in detail.

The IC card reader/writer 22 is a unit including a function of an IC card reader for reading information stored in the IC card and a function of an IC card writer for writing information into the IC card for storage. The IC card reader/writer 22 outputs information of data of the initial user ID, etc., read from the IC card 10 to the gate control section 21. It also writes information of data of the intrazone user ID, etc., output by the gate control section 21 into the IC card 10. The IC card reader/writer 22 may be provided with an operation section, such as a ten-key pad, for the user to enter key data or a sensor for reading biometrics information of a fingerprint, a vein, etc.

The gate 23 is, for example, a door that can be locked and unlocked under the control of the gate control section 21 or a door opened and closed under the control of the gate control section 21. As the gate 23 is opened and closed under the control of the gate control section 21, the user's entrance to or exit from the management zone can be permitted or restricted.

The authentication server 30, which is, for example, a general server computer or the like, is made up of a control section 31, a storage section 32, and a communication section 33. Here, it is assumed that the authentication server 30 is installed in a security guards room where a guard resides. As the authentication server 30 is installed in the security guards room, an unauthorized user can be prevented from accessing information stored in the authentication server 30 and if an anomaly occurs in the entrance and exit management system, immediately the guard can find out the anomaly.

The control section 31, which is, for example, a CPU, etc., operates in accordance with a program stored in the storage section 32. Particularly, the control section 31 performs processing of generating a database such as a user entrance and exit working database temporarily used in addition to conducting of user authentication using a user entrance and exit master stored in the storage section 32. The processing executed by the control section 31 is described later in detail.

The storage section 32 includes at least either of a memory device of RAM, ROM, etc., and a disk device or the like. The storage section 32 stores a program executed by the control section 31 and databases such as the user entrance and exit master used for the control section 31 to perform user authentication processing. The storage section 32 also operates as work memory of the control section 31.

Here, the user entrance and exit master is a database for associating each initial user ID and information as to whether or not the user corresponding to the initial user ID is permitted to enter each management zone with each other; it stores information as shown in FIG. 3 by way of example. In the example, the user U corresponding to the initial user ID "AA12345," the user corresponding to the initial user ID "AA99999," and the guard of the user corresponding to the initial user ID "Z11111" are permitted to enter the management zones A1 and A2, but the user corresponding to the initial user ID "AB33333" is not permitted to enter the management zone A2 although the user is permitted to enter the management zone A1.

The storage section 32 may retain a print service master for determining whether or not the user is permitted to use a printer in addition to the user entrance and exit master. The print service master is a database for associating each initial user ID and information as to whether or not the user corresponding to the initial user ID is permitted to use a printer with each other; it stores information as shown in FIG. 4 by way of example. In the example, the user U and the user corresponding to the initial user ID "AB33333" can use the printer 40a only and the user corresponding to the initial user ID "AA99999" can use both the printers 40a and 40b. However, the user of the guard corresponding to the initial user ID "Z11111" can use neither of the printers.

The communication section 33 is, for example, a network card, a modem, etc., and transmits information through the communication network 50 in accordance with an instruction from the control section 31. The communication section 33 receives information coming through the network 50 and outputs the information to the control section 31.

Each of the printers 40a and 40b is made up of a control section 41, a storage section 42, an IC card reader 43, and an image formation section 44. In the description that follows, the control section, the storage section, the IC card reader, and the image formation section contained in the printer 40a are represented as the control section 41a, the storage section 42a, the IC card reader 43a, and the image formation section 44a; the control section, the storage section, the IC card reader, and the image formation section contained in the printer 40b are represented as the control section 41b, the storage section 42b, the IC card reader 43b, and the image formation section 44b when they need to distinguish between the printers 40a and 40b.

The control section 41 is, for example, a CPU, etc., for controlling the sections of the image formation section 44, etc., and inputting/outputting data from/to the storage section 42 and the IC card reader 43. It also transmits and receives data to and from the authentication server 30 through the communication network 50.

The storage section 42 is, for example, a memory device of RAM, ROM, etc., for retaining a program and data used by the control section 41. Particularly in the embodiment, information concerning use of the printer by the user is retained as a log.

The IC card reader 43 reads information of the intrazone user ID stored on the IC card 10 and outputs the information to the control section 41. The image formation section 44 forms an image corresponding to an image formation request from the user on a medium of paper, etc., under the control of the control section 41.

The communication network 50 connects the authentication server 30 and the gate apparatus 20a and 20b and the printers 40a and 40b so that they can transmit and receive data to and from each other. To more enhance security, a communication network for connecting the authentication server 30 and the gate apparatus 20a, a communication network for connecting the authentication server 30 and the printer 40a in the management zone A1 and the gate apparatus 20b, and a communication network for connecting the authentication server 30 and the printer 40b in the management zone A2 may be configured as separate network segments.

The processing executed by the entrance and exit management system according to the embodiment described above when the user U enters the management zone A1 from a non-management zone will be discussed based on a flowchart of FIG. 5.

First, the user spreads the IC card in front of the IC card reader/writer 22a included in the gate apparatus 20a and enters the key data into the IC card reader/writer 22a or the IC card 10, whereby the IC card reader/writer 22a reads the data of the initial user ID stored on the IC card 10 (S101).

Next, the gate control section 21a transmits the initial user ID read by the IC card reader/writer 22a at S101 to the authentication server 30, thereby inquiring whether or not entrance of the user corresponding to the initial user ID into the management zone A1 is to be permitted (S102).

The communication section 33 of the authentication server 30 receives the initial user ID transmitted by the gate control section 21a and outputs the initial user ID to the control section 31. The control section 31 determines whether or not the gate apparatus 20a is to permit entrance of the user corresponding to the initial user ID based on the data of the initial user ID received by the communication section 33 (S103). Specifically, the control section 31 references the user entrance and exit master, acquires information as to whether or not entrance into the management zone A1 is to be permitted associated with the initial user ID received by the communication section 33, and determines whether or not entrance of the user is to be permitted according to the acquired information. For example, if the data of the initial user ID is "AA12345," the control section 31 determines that entrance into the management zone A1 is to be permitted from the data in the user entrance and exit master shown in FIG. 3.

The control section 31 determining whether or not entrance of the user is to be permitted at S103 transmits the determination result to the gate control section 21a through the communication section 33 (S104). If the gate control section 21a receives the determination result of not permitting entrance of the user, it keeps the gate 23a closed for restricting entrance of the user and outputs information representing inhibition of entrance toga display section (not shown), etc., as required (S105) and terminates the processing.

On the other hand, if the gate control section 21a receives the determination result of permitting entrance of the user at S104, it generates the intrazone user ID to be used by the user in the management zone A1 (S106). The intrazone user ID is determined so as to become a user identifier different from the initial user ID and unique data for each user permitted to enter the management zone. For example, the gate control section 21a generates data of a combination of the number representing the management zone A1 that the user is permitted to enter, the number representing the gate apparatus 20a permitting the user to pass through, the entrance permission date, and the number of the serial number indicating the entrance order into the management zone, starting at a predetermined number and reset each time the date changes as the intrazone user ID.

The gate control section 21a may encrypt the initial user ID and information of the entrance permission date and time in combination to generate the intrazone user ID. Accordingly, if the intrazone user ID is generated using the initial user ID, the intrazone user ID becomes different data in response to the entrance permission date and time. Thus, if the information of the intrazone user ID leaks, it becomes impossible for another person to later use the intrazone user ID to pose as the user U.

Next, the gate control section 21a controls the IC card reader/writer 22a so as to write the intrazone user ID generated at S106 onto the IC card 10 (S107). Accordingly, for example, if the intrazone user ID generated by the gate control section 21a is "A1G20a050725001," information stored on the IC card 10 is changed as shown in FIG. 2(b). After this, the information processing apparatus in the management zone A1 uses the intrazone user ID stored on the IC card 10 to conduct user authentication, etc., and does not use the initial user ID (namely, invalidates the initial user ID).

Subsequently, the gate control section 21a executes control so as to open the gate 23a (S108). Accordingly, the user U is allowed to enter the management zone A1. As the processing is executed in this order, the user U cannot enter the management zone A1 until the data of the intrazone user ID in the IC card 10 possessed by the user U is updated. Further, the gate control section 21a transmits the intrazone user ID generated at S106 to the authentication server 30 (S109).

The control section 31 of the authentication server 30 acquires the intrazone user ID transmitted by the gate control section 21a through the communication section 33 and updates the database retained in the storage section based on the intrazone user ID (S110). Specifically, the control section 31 updates the user entrance and exit working database (DB) and a print service working database (DB).

The user entrance and exit working DB is a database for temporarily retaining the intrazone user ID and information as to whether or not entrance and exit of the user are to be permitted in association with each other. The control section 31 adds a record for the received intrazone user ID to the user entrance and exit working DB. Here, information associated with the initial user ID "AA12345" in the user entrance and exit master used to determine whether or not to permit entrance at S103 and the intrazone user ID "A1G20a050725001" are stored in the user entrance and exit working DB in association with each other. Accordingly, the information stored in the user entrance and exit working DB becomes that as shown in FIG. 6(a).

The print service working DB is a database for temporarily retaining the intrazone user ID and information as to whether or not the user is to be permitted to use the printer in association with each other. The control section 31 adds a record for the received intrazone user ID to the print service working DB. Here, information associated with the initial user ID "AA12345" in the print service master and the intrazone user ID "A1G20a050725001" are stored in the print service working DB in association with each other. Accordingly, the information stored in the print service working DB becomes that as shown in FIG. 7(a).

Further, the control section 31 records a gate passage log (S111). The gate passage log is, for example, log data for associating the old user ID "AA12345," the new user ID "A1G20a050725001," the passage permission date and time, information representing the gate apparatus permitting the user to pass through, and information indicating entrance from which management zone to which management zone in association with each other, and becomes, for example, as shown in FIG. 8(a). Accordingly, the entrance and exit management system according to the embodiment can record not only the information concerning the entrance and exit of the user, but also the correspondence between the initial user ID and the intrazone user ID for later use for verifying the recorded log data, etc., using the intrazone user ID. The gate passage log needs to be strictly managed so as to prevent an unauthorized user of the system from viewing the gate passage log.

Next, a processing example for the user U entering the management zone A1 according to the above-described processing to use the printer 40a installed in the management zone A1 will be discussed based on a flowchart of FIG. 9.

In this case, first the user making an image formation request for the printer 40a, for example, spreads the IC card in front of the IC card reader 43a included in the printer 40a, whereby the IC card reader 43a reads the data of the intrazone user ID stored on the IC card 10 (S201). When the intrazone user ID in the IC card 10 is read, the key data need not be entered and therefore the user need not enter the key data.

Next, the control section 41a of the printer 40a transmits the intrazone user ID read by the IC card reader 43a at S201 to the authentication server 30, thereby inquiring whether or not the user corresponding to the intrazone user ID is to be permitted to use the printer 40a (S202).

The communication section 33 of the authentication server 30 receives the intrazone user ID output by the control section 41a of the printer 40a and outputs the intrazone user ID to the control section 31. The control section 31 determines whether or not the user corresponding to the intrazone user ID is to be permitted to use the printer 40a based on the data of the intrazone user ID received by the communication section 33 (S203). Specifically, the control section 31 references the print service working DB, acquires information as to whether or not use of the printer 40a is to be permitted associated with the received intrazone user ID, and determines whether or not use of the printer 40a is to be permitted according to the acquired information. Here, the data of the intrazone user ID is "A1G20a050725001" and therefore the control section 31 determines that use of the printer 40a is to be permitted from the contents of the print service working DB shown in FIG. 7(a).

Here, the contents of the print service working DB are generated based on the data of the print service master as described above, so that the control section 31 can correctly determine whether or not the user U is to be permitted to use the printer 40a based on the intrazone user ID. Since the print service working DB retains only the information of the intrazone user ID generated for the user permitted to enter the management zone A1, even if the user authorized to use the printer 40a cannot use the printer 40 if the user enters the management zone A1 without receiving write of the intrazone user ID onto the IC card in the gate apparatus 20a. Accordingly, it can be verified that the user entering the management zone is subjected to entrance and exit check by the gate apparatus 20a together with the determination as to whether or not the user is authorized to use the printer without additional verification of flag information recorded on the IC card, etc.

The control section 31 determining whether or not use of the printer 40a is to be permitted at S203 transmits the determination result to the control section 41a of the printer 40a (S204). If the control section 41a receives the determination result of not permitting use of the printer 40a, it does not execute processing corresponding to the image formation request, outputs information representing inhibition of use of the printer 40a to a display section (not shown), etc., as required (S105), and terminates the processing. In this case, the information representing inhibition of use of the printer 40a may be recorded in a print log described later.

On the other hand, if the control section 41 a receives the determination result of permitting use of the printer 40a at S204, it controls the image formation section 44a to form an image in response to the image formation request (S206). Accordingly, the user U can acquire a medium such as paper on which an image is formed using the printer 40a.

Further, the control section 41a records a print log in the storage section 42a (S207). The print log is, for example, log data for associating the intrazone user ID "A1G20a050725001" and information concerning use of the printer 40a such as the use date and time of the printer 40a, the executed processing type, the processed image data, and the number of image formation media in association with each other, and becomes, for example, as shown in FIG. 10.

Accordingly, the entrance and exit management system according to the embodiment can record the information concerning use of the printer using the intrazone user ID. If the print log data leaks, the initial user ID determined based on the employee number is not known and thus the person acquiring the log data illegally cannot know who used the printer. It also becomes difficult to tamper with the log data as if another person used the printer.

Here, the print log is stored in the storage section 42a of the printer 40a, but may be stored in the storage section 32 of the authentication server 30 conducting user authentication. In this case, each print log record is further associated with information representing the used printer for retention. Accordingly, the print log concerning use of a plurality of printers can be managed in the authentication server in a unified manner; also in this case, the print log is associated with the intrazone user ID different from one management zone to another and is managed and therefore if the print log leaks, the risk of identifying the user using the printer can be decreased.

Next, a processing example for the user U entering the management zone A1 to further pass through the gate apparatus 20a and enter the management zone A2 will be discussed based on a flowchart of FIG. 11.

First, the user spreads the IC card in front of the IC card reader/writer 22b included in the gate apparatus 20b, whereby the IC card reader/writer 22b reads the data of the intrazone user ID stored on the IC card 10 (S301). When the intrazone user ID in the IC card 10 is read, the key data need not be entered and therefore the user need not enter the key data at this point in time, as described above.

Next, the gate control section 21b transmits the intrazone user ID read by the IC card reader/writer 22b at S301 to the authentication server 30, thereby inquiring whether or not entrance of the user corresponding to the intrazone user ID into the management zone A2 is to be permitted (S302).

The communication section 33 of the authentication server 30 receives the intrazone user ID transmitted by the gate control section 21b and outputs the intrazone user ID to the control section 31. The control section 31 determines whether or not the gate apparatus 20b is to permit entrance of the user corresponding to the intrazone user ID based on the data of the intrazone user ID received by the communication section 33 (S303). Specifically, the control section 31 references the user entrance and exit working DB, acquires information as to whether or not entrance into the management zone A2 is to be permitted associated with the received intrazone user ID, and determines whether or not entrance of the user is to be permitted according to the acquired information. If the data of the intrazone user ID is "A1G20a050725001," the control section 31 determines that entrance into the management zone A2 is to be permitted from the contents of the user entrance and exit working DB shown in FIG. 6(a).

Here, the contents of the user entrance and exit working DB are generated based on the data of the user entrance and exit master as described above, so that the control section 31 can correctly determine whether or not the user U is to be permitted to enter the management zone based on the intrazone user ID. Since the user entrance and exit working DB retains only the information of the intrazone user ID generated for the user permitted to enter the management zone A1, even if the user authorized to enter the management zone A2 is not permitted to enter the management zone A2 if the user enters the management zone without receiving write of the intrazone user ID onto the IC card in the gate apparatus 20a. Accordingly, the entrance and exit management system according to the embodiment can restrict entrance of the user entering the management zone A1 by unauthorized means into the management zone A2 as with the case of the use of the printer.

The control section 31 determining whether or not entrance of the user is to be permitted at S303 transmits the determination result to the gate control section 21b (S304). If the gate control section 21b receives the determination result of not permitting entrance of the user, it keeps the gate 23b closed for restricting entrance of the user and outputs information representing inhibition of entrance to the display section (not shown), etc., as required (S305) and terminates the processing.

On the other hand, if the gate control section 21b receives the determination result of permitting entrance of the user at S304, it generates a new intrazone user ID to be used by the user in the management zone A2 (S306). The new intrazone user ID is determined so as to become unique data for each user permitted to enter the management zone as with the processing at S6 described above.

Next, the gate control section 21b controls the IC card reader/writer 22b so as to write the intrazone user ID generated at S306 onto the IC card 10 (S307). Accordingly, for example, if the intrazone user ID generated by the gate control section 21b is "A2G20b050725001," information stored on the IC card 10 is changed as shown in FIG. 2(c). At this time, to write the intrazone user ID, the key data needs to be entered and thus the user enters the key data into the IC card reader/writer 22b or the IC card 10.

Subsequently, the gate control section 21b executes control so as to open the gate 23b (S308). Accordingly, the user U is allowed to enter the management zone A2. Further, the gate control section 21b transmits the intrazone user ID generated at S306 to the authentication server 30 (S309).

The control section 31 of the authentication server 30 acquires the intrazone user ID transmitted by the gate control section 21b through the communication section 33 and updates the database retained in the storage section based on the intrazone user ID (S310). Specifically, the control section 31 updates the user entrance and exit working DB and the print service working DB.

First, the control section 31 updates the intrazone user ID "A120a050725001" used to determine whether or not to permit entrance at S303 in the user entrance and exit working DB to the received intrazone user ID "A2G20b050725001." Accordingly, the information retained in the user entrance and exit working DB becomes as shown in FIG. 6(b).

Further, the control section 31 also updates the old intrazone user ID "A1G20a050725001" to the received intrazone user ID "A2G20b050725001" in the print service working DB. Accordingly, the information retained in the print service working DB becomes as shown in FIG. 7(b).

At this point in time, the old intrazone user ID "A1G20a050725001" is deleted from the user entrance and exit working DB and the print service working DB and therefore the intrazone user ID becomes invalid and it becomes impossible to pass through the gate apparatus and use the printer using the intrazone user ID. Accordingly, if a person illegally getting the information of the intrazone user ID later forges and uses an IC card storing the intrazone user ID, entrance into and exit from the management zone and use of the printer are not permitted.

Further, the control section 31 records a gate passage log (S311). Accordingly, the contents of the gate passage log become as shown in FIG. 8(b), for example.

Figure 9:
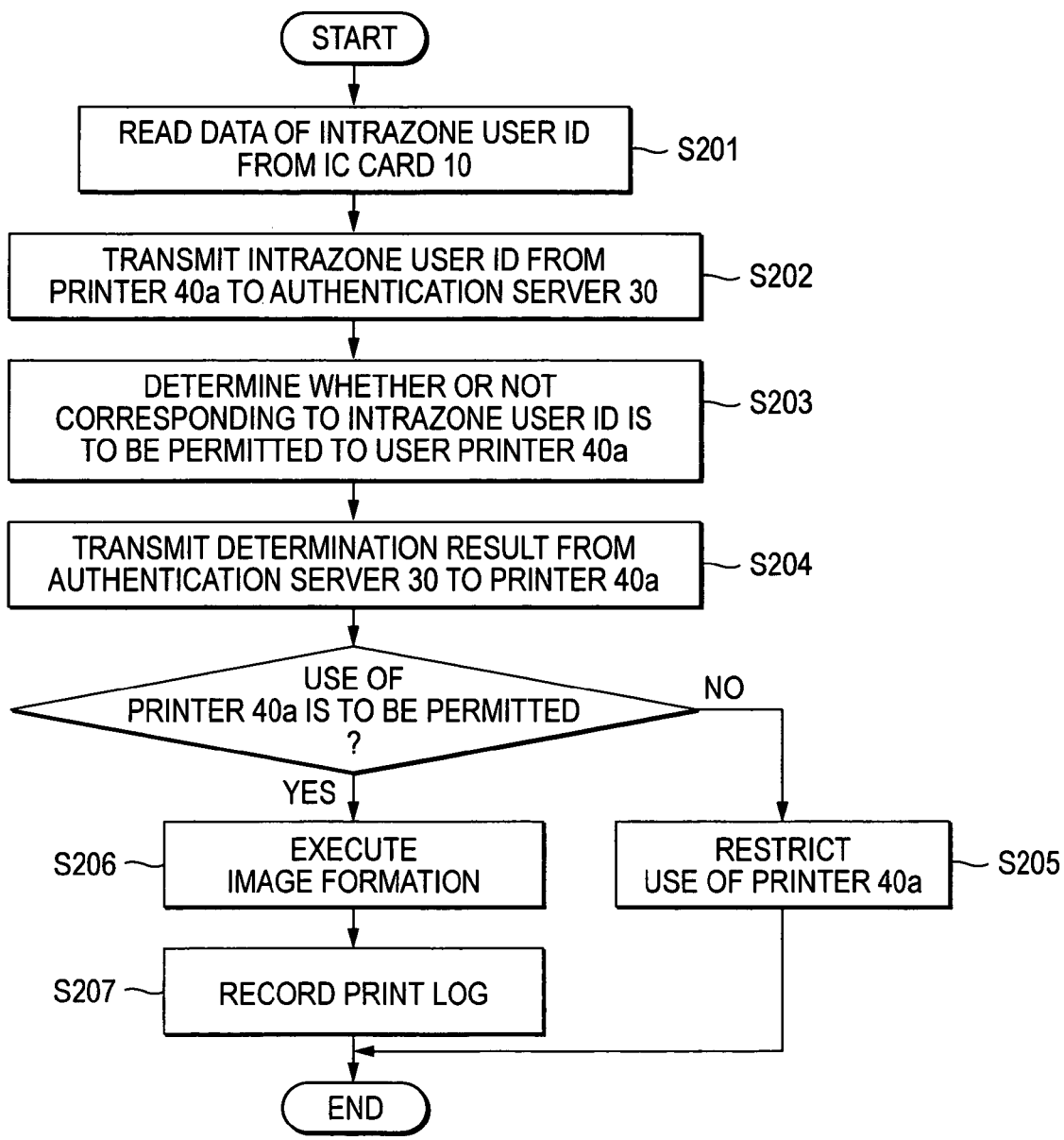
FIG. 9 is a flowchart to show an example of processing executed by the entrance and exit management system according to the embodiment of the invention when the user uses a printer 40b.

If the user U entering the management zone A2 according to the above-described processing further uses the printer 40b installed in the management zone A2, the printer 40b and the authentication server 30 determine whether or not to permit use of the printer 40b according to a similar procedure to that in the flowchart of FIG. 9. In this case, the control section 31 of the authentication server 30 determines that the user corresponding to the intrazone user ID "A2G20b050725001" cannot use the printer 40b based on the information retained in the print service working DB shown in FIG. 7(b). Therefore, the user U cannot use the printer 40b; also in this case, the data of the intrazone user ID is transmitted and received on the communication network 50 and thus it is not feared that the initial user ID may be tapped.

Figure 11:
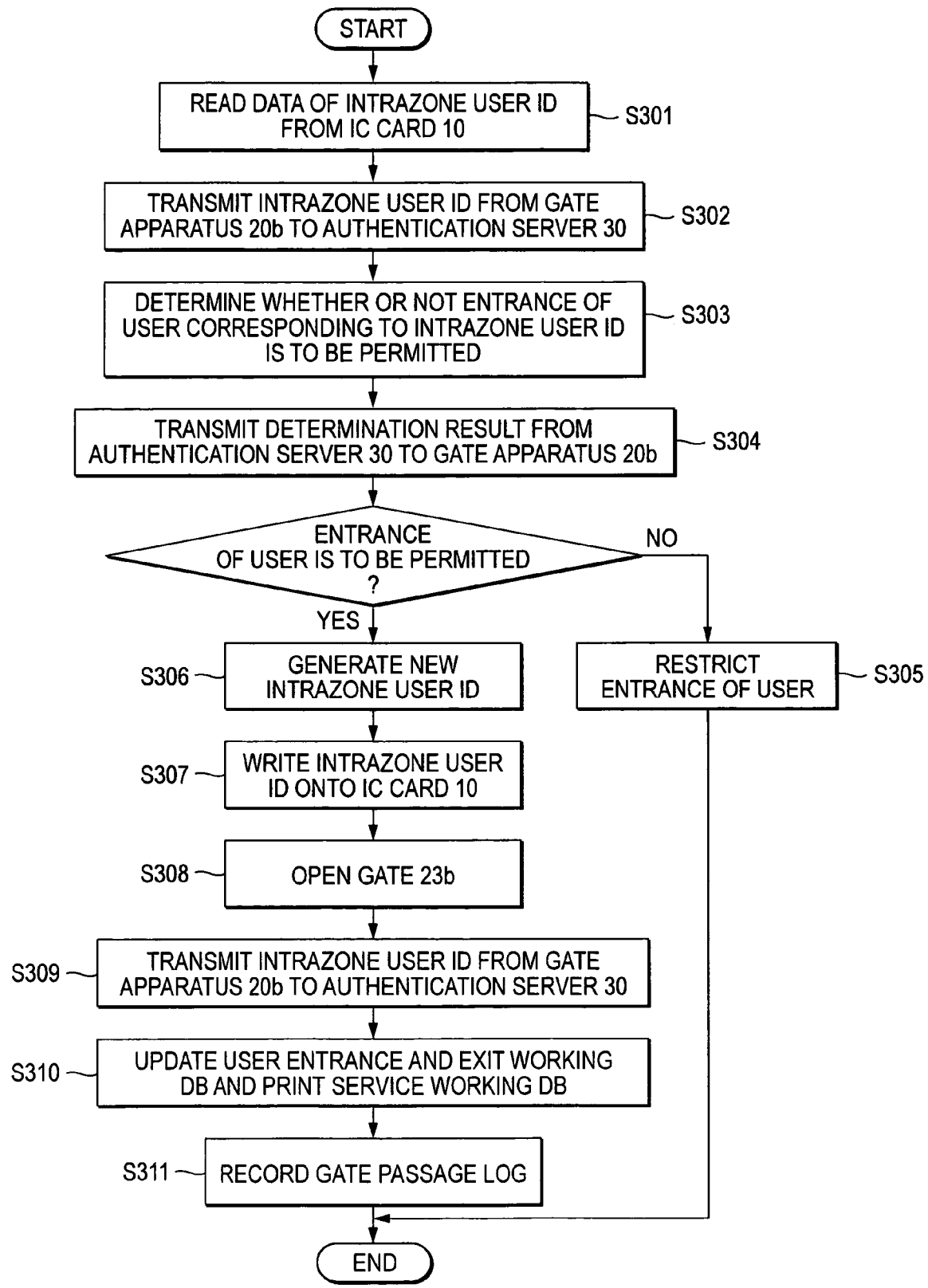
FIG. 11 is a flowchart to show an example of processing executed by the entrance and exit management system according to the embodiment of the invention when the user enters a management zone A2 from the management zone A1.

Further, if the user U entering the management zone A2 passes through the gate apparatus 20b and exits to the management zone A1, similar processing to that shown in the flowchart of FIG. 11 is executed, whereby the current intrazone user ID "A2G20b050725001" is invalided and a new intrazone user ID is generated and is written onto the IC card 10. In this case, the determination as to whether or not entrance into the management zone A1 is to be permitted at S302 to S305 may be skipped because of a move from the management zone wherein the security level is high to the management zone wherein the security level is low. Also in this case, however, it becomes necessary to generate a new intrazone user ID and update the intrazone user ID in the user entrance and exit working DB and the print service working DB retained the IC card and the authentication server 30 based on the new intrazone user ID.

If the user U in the management zone A1 passes through the gate apparatus 20a and exits to a non-management zone, the gate apparatus 20a and the authentication server 30 perform the following processing:

First, the IC card reader/writer 22a of the gate apparatus 20a reads the data of the intrazone user ID and transmits the data to the authentication server 30.

The control section 31 of the authentication server 30 deletes the records in the user entrance and exit working DB and the print service working DB corresponding to the intrazone user ID based on the data of the intrazone user ID received through the communication section 33. The control section 31 records the fact that the user corresponding to the intrazone user ID exits to a non-management zone in the gate passage log. If the user U enters from a non-management zone through the management zone A1 to the management zone A2 again exits to the non-management zone, the gate passage log becomes as shown in FIG. 8(*c*), for example.

On the other hand, the gate control section 21a of the gate apparatus 20a causes the IC card reader/writer 22a to erase the data of the intrazone user ID stored on the IC card 10. Accordingly, the information stored on the IC card 10 is restored to that before entrance of the user shown in FIG. 2(*a*). Thus, the initial user ID again becomes valid. Further, the gate control section 21a opens the gate 23a. Accordingly, the user U exits to the non-management zone and the record concerning the exit of the user is entered in the gate passage log. In this case, the data of the initial user ID does not flow on the communication network 50 either.

According to the embodiment described above, the print log concerning use of the printer installed in the management zone is recorded using the intrazone user ID, so that the risk of leakage of the initial user identifier from the print log can be decreased and security can be enhanced. The number of times the initial user identifier is transmitted and received on the communication network 50 is suppressed to the necessary minimum, whereby the risk of leakage of the initial user identifier because of tapping can be decreased and security can be enhanced. Further, since the intrazone user identifier changes each time the user passes through the gate, the risk of disguise with the user ID forged can be decreased and security can be enhanced.

In the example described above, the gate control sections 21 of the gate apparatus 20a and 20b generate the intrazone user ID, but the embodiment of the invention is not limited to the mode. For example, the authentication server 30 receiving an inquiry as to whether or not passage of the user is to be permitted from the gate apparatus may generate the intrazone user ID and transmit the intrazone user ID to the gate apparatus. In this case, the intrazone user ID is generated in the authentication server 30 in a unified manner and thus if a plurality of management zones and a plurality of gate apparatus exist, the need for determining the intrazone user ID using the number representing the management zone and the number representing the gate apparatus is eliminated. Thus, for example, if the intrazone user IDs of the same data length are used by generating the intrazone user IDs using random numbers only, it can be made more difficult to forge the intrazone user ID. In this case, processing of generating the intrazone user ID can be realized as the control section 31 executes the program stored in the storage section 32 of the authentication server 30 as with the user authentication processing, etc.

Alternatively, the IC card may generate the intrazone user ID based on date and time information and the data of the random number accepted from the gate apparatus, etc., for example. In this case, however, the intrazone user ID needs to be generated based on unique information stored on the IC card such as the initial user ID so that the generated intrazone user IDs do not cause the users entering the same management zone to collide with each other.

In the embodiment, the print service master and the print service working DB are retained in the storage section 32 of the authentication server 30, but an additional print management server may be installed to determine whether or not use of each printer is to be permitted. In this case, the print management server retains a print service master for associating the initial user IDs and information as to whether or not use of each printer is to be permitted with each other, and generates a print service working DB based on the data of the print service master and the data indicating the correspondence between the initial user IDs and the intrazone user IDs transmitted from the authentication server 30. The printer installed in each management zone inquires of the print management server whether or not the user corresponding to the intrazone user ID stored on the IC card is to be permitted to use the printer.

In the example, the initial user ID is transmitted and received through the communication network between the authentication server 30 and the print management server and therefore the risk of leakage of the initial user ID increases a little. However, the authentication server 30 for managing entrance and exit of the user and the print management server for managing permission/no permission of printer use and the printer use history are separated, whereby convenience of management can be improved and the risk when the server is illegally accessed can be distributed. In this case, it is desirable that like the authentication server 30, the print management server should be installed in an environment where unauthorized access cannot easily be made.

The entrance and exit management system according to the embodiment of the invention may limit the number of the intrazone user identifiers generated by the gate apparatus or the authentication server to a predetermined number. Accordingly, the number of the users allowed to enter the management zone can be restricted together with generation processing of the intrazone user identifiers.

Further, the entrance and exit management system according to the embodiment of the invention may invalidate the intrazone user identifiers based on a predetermined timing when the date changes, etc., for example. Specifically, each intrazone user identifier is invalidated as the record for the intrazone user identifier is deleted from the user entrance and exit working DB and the print service working DB. Accordingly, even if information of the intrazone user identifier is left in the IC card, after the intrazone user identifier becomes invalid, it becomes impossible to enter and exit the management zone and use the information processing apparatus using the intrazone user identifier. Thus, for example, if an unauthorized user finds the IC card, etc., unauthorized use of the IC card can be prevented.

In the description given above, when the user moves from one management zone to another management zone, the intrazone user ID stored on the IC card is updated to a new intrazone user ID, whereby the intrazone user ID corresponding to the management zone from which the user exits is invalidated. When the user exits from one management zone to a non-management zone, the gate apparatus erases the intrazone user ID stored on the IC card, whereby the intrazone user ID is invalidated. However, the means for invalidating the intrazone user ID in the invention is not limited to them. For example, the intrazone user ID stored on the IC card is not erased and the record associated with the intrazone user ID may be deleted from the database retained in the authentication server 30 to invalidate the intrazone user ID as with the case where the intrazone user ID is invalidated with date change, etc., described above.

Further, to invalidate the intrazone user ID, the authentication server 30 may adopt the following means instead of the method of deleting the record associated with the intrazone user ID from the user entrance and exit working DB and the print service working DB: An invalidation flag indicating stop of use of the intrazone user ID is set associated with the record or a validation flag indicating that the intrazone user ID is preset associated with each record and to invalidate the intrazone user ID, the validation flag is deleted. In addition to the user entrance and exit working DB and the print service working DB, a database containing a list of the currently valid intrazone user IDs may be provided and the databases may be used in combination to determine the currently valid intrazone user ID. In this case, the intrazone user ID can be invalidated as it is deleted from the list of the currently valid intrazone user IDs. Further, for example, the intrazone user ID may be deleted from the user entrance and exit working DB and the print service working DB after the expiration of a predetermined time from the invalidation of the intrazone user ID. When the user simply moves from one management zone to another management zone, the record corresponding to the intrazone user ID is not erased and when the user finally exits to a non-management zone, the records corresponding to all intrazone user IDs issued to the user may be deleted from the user entrance and exit working DB and the print service working DB.

Alternatively, information of the intrazone user ID may be retained on the IC card together with flag information to determine whether or not the intrazone user ID is valid, and whether or not the intrazone user ID is invalidated may be determined according to the flag information. In this case, when the user moves from one management zone to another management zone, the intrazone user ID corresponding to the old management zone is retained intact in the IC card 10 and the flag representing that the intrazone user ID is valid is erased. The intrazone user ID corresponding to the new management zone is generated and is written and a flag representing that the new intrazone user ID is valid is set. The information processing apparatus installed in the management zone can read the intrazone user ID for which the flag representing that the intrazone user ID is valid is set and can use the currently valid intrazone user ID to record a log, etc.

In the description given above, when the user moves from one management zone to another management zone, a new intrazone user ID is always issued, but the invention is not limited to such embodiment. That is, when the user again enters the once entered management zone, for example, in such a manner that the user entering the management zone A2 from the management zone A1 again enters the management zone A1 from the management zone A2, the user may be allowed to reuse the previously used intrazone user ID in the management zone. In this case, the invalidated intrazone user ID is retained together with information representing that the intrazone user ID is not valid at least in either the IC card 10 or the authentication server 30 as described above, without erasing the invalidated intrazone user ID from the IC card 10 and the authentication server 30. The previously invalidated intrazone user ID which is retained is again validated by a method of setting a flag representing that the intrazone user ID is valid, etc., without issuing a new intrazone user ID based on a predetermined condition. Accordingly, the user can reuse the previous intrazone user ID; for example, when the user moves to another management zone during the use of the information processing apparatus such as a computer terminal or a printer and returns to the former management zone for continuing the processing, etc., the processing can be continued without again conducting user authentication based on a new intrazone user ID, and the convenience of the user can be improved.

As the predetermined condition, a condition of reusing the intrazone user ID if the user again enters the management zone within a given time from exiting the management zone or the like can be used, for example. A condition of reusing the intrazone user ID when the user enters from a predetermined gate apparatus or management zone may be used. In the example in FIG. 1, if the user enters the management zone A1 through the gate apparatus 20a, a new intrazone user ID is always issued and on the other hand, if the user enters the management zone A2 through the gate apparatus 20b, the intrazone user ID can be reused. According to the condition, for example, if the user cannot enter a management zone (in the example given above, the management zone A2) unless the user passes through one management zone (in the example given above, the management zone A1), when the user enters the management zone A2, the intrazone user ID used in the management zone A1 is retained in association with the management zone A1 and if the user again enters the management zone A1 from the management zone A2, the previous intrazone user ID can be reused. Accordingly, the entrance and exit management system can be operated in response to the use mode of the user and the security demands in such a manner that the intrazone user ID is reused in the management zone that the user again enters surely and that if the user enters the management zone requiring stronger security management, a new intrazone user ID is always issued.

While the invention has been described in conjunction with the specific embodiments described above, many equivalent alternatives, modifications and variations may become apparent to those skilled in the art when given this disclosure. Accordingly, the exemplary embodiments of the invention as set forth above are considered to be illustrative and not limiting. Various changes to the described embodiments may be made without departing from the spirit and scope of the invention.

The entire disclosure of Japanese Patent Application No. 2005-289318 filed on Sep. 30, 2005 including specification, claims, drawings and abstract is incorporated herein by reference in its entirety.

What is claimed is:

1. A control method for an entrance management system using an information storage medium storing therein a user identifier for identifying a user, the method comprising:

reading by a first processor the user identifier from the information storage medium;

transmitting the user identifier to a second processor and determining by the second processor whether or not entrance to a first management zone by a user corresponding to the user identifier is permitted, the second processor having a database of correspondence between each user identifier and the user corresponding to said each user identifier;

transmitting a determination result back to the first processor and controlling entrance by the user corresponding to the user identifier to the first management zone based on the determination result;

the first processor determining that the determination result is to permit entrance to the first management zone by the user corresponding to the user identifier, generating by the first processor a first intrazone user identifier, writing the first intrazone user identifier to the information storage medium, opening a gate to the first management zone, sending the first intrazone user identifier to the second processor, and updating the database of correspondence in the second processor using the first intrazone user identifier, the first intrazone user identifier being based on a combination of the user identifier, and information of a permission date and a time for the user's entrance into the first management zone;

reading by a third processor the first intrazone user identifier from the information storage medium;

transmitting the first intrazone identifier to the second processor and determining by the second processor whether or not entrance to a second management zone by the user corresponding to the first intrazone user identifier is permitted, the second processor having a database of correspondence between each first intrazone user identifier and the user identifier corresponding to said each first intrazone user identifier;

transmitting a determination result back to the third processor and controlling entrance by the user corresponding to the first intrazone user identifier to the second management zone based on the determination result; and the third processor determining that the determination result is to permit entrance to the second management zone by the user corresponding to the first intrazone user identifier, generating by the third processor a second intrazone user identifier, invalidating the first intrazone user identifier, writing the second intrazone user identifier to the information storage medium, opening a gate to the second management zone, sending the second intrazone user identifier to the second processor, and updating the database of correspondence in the second processor using the second intrazone user identifier, the second intrazone user identifier being based on a combination of the first intrazone user identifier, and information of a permission date and a time for the user's entrance into the second management zone.

2. The control method according to claim 1, wherein an information processing apparatus is located within the first management zone, The control method further comprising:

reading by the information processing apparatus the first intrazone user identifier; and recording in the information processing apparatus information concerning use of the information processing apparatus by the user in association with the intrazone user identifier.

3. A nontransitory computer readable medium storing a program when executed causing a computer to perform a process for controlling entrance into managed zones using an information storage medium storing therein a user identifier for identifying a user, the process comprising:

reading by a first processor the user identifier from the information storage medium;

transmitting the user identifier to a second processor and determining by the second processor whether or not entrance to a first management zone by a user corresponding to the user identifier is permitted, the second processor having a database of correspondence between each user identifier and the user corresponding to said each user identifier;

transmitting a determination result back to the first processor and controlling entrance by the user corresponding to the user identifier to the first management zone based on the determination result;

the first processor determining that the determination result is to permit entrance to the first management zone by the user corresponding to the user identifier, generating by the first processor a first intrazone user identifier, writing the first intrazone user identifier to the information storage medium, opening a gate to the first management zone, sending the first intrazone user identifier to the second processor, and updating the database of correspondence in the second processor using the first intrazone user identifier, the first intrazone user identifier being based on a combination of the user identifier, and information of a permission date and a time for the user's entrance into the first management zone;

reading by a third processor the first intrazone user identifier from the information storage medium;

transmitting the first intrazone identifier to the second processor and determining by the second processor whether or not entrance to a second management zone by the user corresponding to the first intrazone user identifier is permitted, the second processor having a database of correspondence between each first intrazone user identifier and the user identifier corresponding to said each first intrazone user identifier;

transmitting a determination result back to the third processor and controlling entrance by the user corresponding to the first intrazone user identifier to the second management zone based on the determination result; and the third processor determining that the determination result is to permit entrance to the second management zone by the user corresponding to the first intrazone user identifier, generating by the third processor a second intrazone user identifier, invalidating the first intrazone user identifier, writing the second intrazone user identifier to the information storage medium, opening a gate to the second management zone, sending the second intrazone user identifier to the second processor, and updating the database of correspondence in the second processor using the second intrazone user identifier, the second intrazone user identifier being based on a combination of the first intrazone user identifier, and information of a permission date and a time for the user's entrance into the second management zone.

4. The nontransitory computer readable medium, according to claim 3, wherein an information processing apparatus is located within the first management zone, The process further comprising:

reading by the information processing apparatus the first intrazone user identifier; and recording in the information processing apparatus information concerning use of the information processing apparatus by the user in association with the intrazone user identifier.

\* \* \* \* \*